(12) United States Patent
Passani et al.

(10) Patent No.: US 9,547,727 B2
(45) Date of Patent: Jan. 17, 2017

(54) SYSTEM AND METHOD FOR USING A DEVICE DESCRIPTION REPOSITORY

(75) Inventors: Luca Passani, Ashburn, VA (US); Steve Kamerman, Ashburn, VA (US)

(73) Assignee: Scientiamobile, Inc., Reston, VA (US)

( * ) Notice: Subject to any disclaimer, the term of this patent is extended or adjusted under 35 U.S.C. 154(b) by 0 days.

(21) Appl. No.: 13/558,201

(22) Filed: Jul. 25, 2012

(65) Prior Publication Data

US 2013/0031120 A1  Jan. 31, 2013

Related U.S. Application Data

(60) Provisional application No. 61/511,287, filed on Jul. 25, 2011, provisional application No. 61/555,760, filed on Nov. 4, 2011, provisional application No. 61/604,799, filed on Feb. 29, 2012, provisional application No. 61/663,108, filed on Jun. 22, 2012.

(51) Int. Cl.
*G06F 17/30* (2006.01)
*G06F 9/50* (2006.01)

(52) U.S. Cl.
CPC ....... *G06F 17/30905* (2013.01); *G06F 9/5044* (2013.01); *G06F 17/30864* (2013.01)

(58) Field of Classification Search
CPC ............... G06F 17/30864; G06F 17/30386; G06F 17/30023; H04L 67/42
USPC .................. 707/758, 756; 709/203
See application file for complete search history.

(56) References Cited

U.S. PATENT DOCUMENTS

| | | | |
|---|---|---|---|
| 7,317,952 B2 * | 1/2008 | Bhandiwad | G05B 19/4185 700/17 |
| 7,461,086 B1 | 12/2008 | Hurren et al. | |
| 7,716,077 B1 | 5/2010 | Mikurak | |
| 7,962,565 B2 * | 6/2011 | Coker | G06F 9/547 709/217 |
| 8,166,155 B1 | 4/2012 | Rachmeler et al. | |
| 8,209,344 B2 * | 6/2012 | Ramer | G06Q 30/02 707/758 |
| 8,255,403 B2 | 8/2012 | Kenedy et al. | |

(Continued)

FOREIGN PATENT DOCUMENTS

| | | |
|---|---|---|
| EP | 1788481 A1 | 5/2007 |
| WO | 2006017682 A2 | 2/2006 |

(Continued)

OTHER PUBLICATIONS

Markel Vigo et al., "Evaluating Web Accessibility for Specific Mobile Devices", Apr. 2008, ACM, pp. 65-72.*

(Continued)

*Primary Examiner* — Pierre Vital
*Assistant Examiner* — Nargis Sultana
(74) *Attorney, Agent, or Firm* — Brian J. Colandreo; Michael T. Abramson; Holland & Knight LLP

(57) ABSTRACT

A method, computer program product, and computer system for using a device description repository comprises identifying a plurality of string constants associated with an incoming data request. It may be determined whether one or more constants in a user agent string match one of the plurality of string constants. In response to determining that the one or more constants in the user agent string match one of the plurality of string constants, a generic web browser ID is identified as a device description repository ID associated with a device description repository.

12 Claims, 10 Drawing Sheets

(56) References Cited

U.S. PATENT DOCUMENTS

| | | | |
|---|---|---|---|
| 8,307,099 B1* | 11/2012 | Khanna | H04L 67/22 705/51 |
| 8,381,266 B2* | 2/2013 | Sama | G06F 21/00 715/736 |
| 8,438,184 B1* | 5/2013 | Wang | H04L 67/02 707/780 |
| 8,438,219 B2* | 5/2013 | Patrawala et al. | 709/203 |
| 8,473,938 B1 | 6/2013 | Feeser | |
| 8,694,544 B2* | 4/2014 | Demant | G06F 17/30091 707/792 |
| 9,058,404 B2 | 6/2015 | Passani | |
| 2002/0046257 A1* | 4/2002 | Killmer | G06F 17/30873 709/218 |
| 2002/0103881 A1* | 8/2002 | Granade | H04W 4/18 709/218 |
| 2003/0105589 A1* | 6/2003 | Liu | G06F 17/30017 702/1 |
| 2003/0135358 A1* | 7/2003 | Lissauer | G06F 17/2872 704/2 |
| 2004/0153358 A1 | 8/2004 | Lienhart | |
| 2004/0172484 A1* | 9/2004 | Hafsteinsson | G06F 17/30905 709/246 |
| 2004/0268341 A1* | 12/2004 | Kenworthy | G06F 9/4411 717/174 |
| 2005/0188056 A1* | 8/2005 | Kangas | H04L 69/329 709/218 |
| 2005/0227679 A1* | 10/2005 | Papulov | 455/414.3 |
| 2005/0251326 A1* | 11/2005 | Reeves | H04L 67/16 701/519 |
| 2006/0031532 A1* | 2/2006 | Sanders | G06F 17/30905 709/227 |
| 2006/0069808 A1* | 3/2006 | Mitchell | G06F 17/30905 709/246 |
| 2006/0236408 A1* | 10/2006 | Yan | G06F 21/6218 726/29 |
| 2007/0061412 A1 | 3/2007 | Karidi et al. | |
| 2007/0192130 A1 | 8/2007 | Sandhu | |
| 2008/0177794 A1 | 7/2008 | Spencer et al. | |
| 2008/0235811 A1* | 9/2008 | Yan | 726/29 |
| 2009/0106431 A1* | 4/2009 | Garfinkle | H04L 67/02 709/228 |
| 2009/0210514 A1* | 8/2009 | Davis | G06F 17/30905 709/219 |
| 2009/0264105 A1 | 10/2009 | Iqram | |
| 2009/0327264 A1* | 12/2009 | Yu | G06F 17/30864 |
| 2010/0057843 A1* | 3/2010 | Landsman | H04L 63/0407 709/203 |
| 2010/0076955 A1* | 3/2010 | Van Steenbergen | H04L 67/306 707/711 |
| 2010/0146585 A1 | 6/2010 | Li et al. | |
| 2010/0161804 A1* | 6/2010 | Jeon | H04L 67/02 709/226 |
| 2010/0250131 A1 | 9/2010 | Relyea et al. | |
| 2011/0078582 A1* | 3/2011 | Christianson | G06F 17/30905 715/747 |
| 2011/0138064 A1* | 6/2011 | Rieger | G06F 17/30905 709/228 |
| 2011/0153656 A1* | 6/2011 | Sundstrom | H04L 67/06 707/769 |
| 2011/0161409 A1* | 6/2011 | Nair | G06F 8/38 709/203 |
| 2011/0270774 A1 | 11/2011 | Varshavsky et al. | |
| 2012/0041819 A1* | 2/2012 | Ramer | G06Q 30/0247 705/14.46 |
| 2012/0042067 A1* | 2/2012 | Gerstenfeld | G06F 17/30516 709/224 |
| 2012/0047199 A1* | 2/2012 | Patrawala | G06F 17/3089 709/203 |
| 2012/0084206 A1* | 4/2012 | Mehew et al. | 705/44 |
| 2012/0168494 A1* | 7/2012 | Kim | G06F 9/54 235/375 |
| 2012/0184258 A1* | 7/2012 | Kovvali | H04W 4/18 455/418 |
| 2012/0215896 A1* | 8/2012 | Johannsen | G06F 21/44 709/223 |
| 2012/0233239 A1* | 9/2012 | Urim | G06F 9/542 709/203 |
| 2012/0254402 A1* | 10/2012 | Panidepu | G06F 17/30905 709/224 |
| 2012/0254768 A1 | 10/2012 | Aggarwal et al. | |
| 2013/0007625 A1* | 1/2013 | Lozinski | G06Q 10/06 715/738 |
| 2013/0031072 A1 | 1/2013 | Passani et al. | |
| 2013/0031103 A1 | 1/2013 | Passani et al. | |
| 2013/0031120 A1 | 1/2013 | Passani et al. | |
| 2013/0080267 A1* | 3/2013 | McGowan | 705/14.73 |
| 2013/0080268 A1 | 3/2013 | Gordon et al. | |
| 2013/0080498 A1* | 3/2013 | Desilva | H04L 67/22 709/201 |
| 2013/0080579 A1 | 3/2013 | Gordon et al. | |
| 2013/0080772 A1 | 3/2013 | McGowan | |
| 2013/0166678 A1* | 6/2013 | Barak | H04L 67/303 709/217 |

FOREIGN PATENT DOCUMENTS

| | | |
|---|---|---|
| WO | 2007002066 A2 | 1/2007 |
| WO | WO 2007002066 A2 * | 1/2007 |

OTHER PUBLICATIONS

Tayeb Lemouma et al., "Context-Aware Adaptation for Mobile Devices", 2004, IEEE International Conference on Mobile Data Management (MDM'04).*

Non-Final Office Action issued in counterpart U.S. Appl. No. 13/558,185 on May 22, 2013.

Final Office Action issued in counterpart U.S. Appl. No. 13/558,185 on Dec. 19, 2013.

Non-Final Office Action issued in counterpart U.S. Appl. No. 13/558,185 on May 1, 2014.

Notice of Allowance issued in counterpart U.S. Appl. No. 13/558,185 on Feb. 18, 2015.

* cited by examiner

| Mobile Constants | Desktop Constants | SmartTV Constants |
|---|---|---|
| 'midp','mobile','android','samsung','nokia','up.browser','phone','opera mini','opera mobi','brew','sonyericsson','blackberry','netfront','uc browser','symbian','j2me','wap2','up.link','windows ce','vodafone','ucweb','zte-','ipad;','docomo','armv','maemo','palm','bolt','fennec','wireless','adr-','htc','nintendo','zunewp7','skyfire','htc','silk','untrusted','lgtelecom' | 'wow64',' .net clr','gtb7','macintosh','slcc1','gtb6','funwebproducts','aol 9.','gtb8' | 'googletv','boxee','sonydtv','appletv','smarttv','dlna' |

SYSTEM AND METHOD FOR USING A DEVICE DESCRIPTION REPOSITORY

RELATED CASES

This application claims the benefit of U.S. Provisional Application No. 61/511,287, filed on 25 Jul. 2011 by Passani; U.S. Provisional Application No. 61/555,760, filed on 4 Nov. 2011 by Passani et al.; U.S. Provisional Application No. 61/604,799, filed on 29 Feb. 2012 by Passani et al.; and U.S. Provisional Application No. 61/663,108, filed on 22 Jun. 2012 by Passani, the entire contents of which are herein incorporated by reference.

TECHNICAL FIELD

This disclosure relates to device description repository systems and methods.

BACKGROUND

With the expanding diversity of computing devices (e.g., mobile phones, tablets, desktops, etc.), device fragmentation may occur. For example, some computing devices and their run-time applications (e.g., browser) may vary with regard to e.g., hardware characteristics (e.g., screen size), extension formats (e.g., WBMP, GIF, MP3, WMV), browser behavior (e.g., Openwave WML, XHTML-MP support), and formatting/speed/image layout (e.g., MMS formatting, sender/receiver clients). As would be expected, device fragmentation may make it more difficult for users of the computing devices to receive the user experience that is either desired by the users and/or intended by the content provider.

SUMMARY OF DISCLOSURE

In one implementation, a method for using a device description repository (DDR), performed by one or more computing devices, comprises accessing from a device description repository environment on a computing device, a computing device profile hierarchy that represents one or more computing device capabilities of one or more computing devices. A run-time profile hierarchy that represents one or more run-time capabilities of one or more applications is accessed from the device description repository environment. At least a portion of the one or more run-time capabilities in the run-time profile hierarchy is detected separately from the computing device profile hierarchy.

One or more of the following features may be included. Detecting at least the portion of the one or more run-time capabilities separately from the computing device profile hierarchy may include using at least one of an on-request manufactured user agent string and a repository manufactured user agent string. Using the on-request manufactured user agent string may include combining at least a portion of a plurality of headers of a data request for the device description repository environment on the computing device. The on-request manufactured user agent string may be used to create a device description repository ID for at least one of the one or more run-time capabilities of the one or more applications in the run-time profile hierarchy and at least one of the one or more computing device capabilities of one or more computing devices in the computing device profile hierarchy. The device description repository ID may include a wireless universal resource file ID. At least one of the one or more run-time capabilities and the one or more computing device capabilities may include a virtual capability. A control capability value of at least one of the one or more run-time capabilities of the one or more applications may be set using a patch file to override at least one of the one or more run-time capabilities of the one or more applications.

In another implementation, a computer program product resides on a computer readable storage medium that has a plurality of instructions stored on it. When executed by a processor, the instructions cause the processor to perform operations comprising accessing from a device description repository environment on a computing device, a computing device profile hierarchy that represents one or more computing device capabilities of one or more computing devices. A run-time profile hierarchy that represents one or more run-time capabilities of one or more applications is accessed from the device description repository environment. At least a portion of the one or more run-time capabilities in the run-time profile hierarchy is detected separately from the computing device profile hierarchy.

One or more of the following features may be included. Detecting at least the portion of the one or more run-time capabilities separately from the computing device profile hierarchy may include using at least one of an on-request manufactured user agent string and a repository manufactured user agent string. Using the on-request manufactured user agent string may include combining at least a portion of a plurality of headers of a data request for the device description repository environment on the computing device. The on-request manufactured user agent string may be used to create a device description repository ID for at least one of the one or more run-time capabilities of the one or more applications in the run-time profile hierarchy and at least one of the one or more computing device capabilities of one or more computing devices in the computing device profile hierarchy. The device description repository ID may include a wireless universal resource file ID. At least one of the one or more run-time capabilities and the one or more computing device capabilities may include a virtual capability. A control capability value of at least one of the one or more run-time capabilities of the one or more applications may be set using a patch file to override at least one of the one or more run-time capabilities of the one or more applications.

In another implementation, a computing system includes a processor and memory configured to perform operations comprising accessing from a device description repository environment on a computing device, a computing device profile hierarchy that represents one or more computing device capabilities of one or more computing devices. A run-time profile hierarchy that represents one or more run-time capabilities of one or more applications is accessed from the device description repository environment. At least a portion of the one or more run-time capabilities in the run-time profile hierarchy is detected separately from the computing device profile hierarchy.

One or more of the following features may be included. Detecting at least the portion of the one or more run-time capabilities separately from the computing device profile hierarchy may include using at least one of an on-request manufactured user agent string and a repository manufactured user agent string. Using the on-request manufactured user agent string may include combining at least a portion of a plurality of headers of a data request for the device description repository environment on the computing device. The on-request manufactured user agent string may be used to create a device description repository ID for at least one of the one or more run-time capabilities of the one or more applications in the run-time profile hierarchy and at least one of the one or more computing device capabilities of one or more computing devices in the computing device profile hierarchy. The device description repository ID may include a wireless universal resource file ID. At least one of the one or more run-time capabilities and the one or more computing device capabilities may include a virtual capability. A control capability value of at least one of the one or more run-time capabilities of the one or more applications may be set using a patch file to override at least one of the one or more run-time capabilities of the one or more applications.

In one implementation, a method for using a device description repository, performed by one or more computing devices, comprises calculating an index by a processor based upon, at least in part, at least a portion of a plurality of user preferences associated with a computing device. One of a first experience and a second experience may be provided to the computing device based upon, at least in part, the index.

One or more of the following features may be included. Calculating the index may include analyzing one or more responses from one or more users to one or more surveys. Calculating the index may include discarding one or more of the plurality of user preferences associated with the computing device if the one or more of the plurality of the user preferences is less than a sum of a plurality of two or more user preferences of the plurality of user preferences associated with the computing device. Providing to the computing device one of the first experience and the second experience based upon, at least in part, the index may include determining whether the index is above a threshold value. If the index is below the threshold value, the first experience may be provided to the computing device, and if the index is above the threshold value, the second experience may be provided to the computing device. The index may be associated with a profile of the computing device. The profile of the computing device may include a device description repository profile of the computing device. The device description repository profile of the computing device may include a wireless universal resource file profile of the computing device.

In another implementation, a computer program product resides on a computer readable storage medium that has a plurality of instructions stored on it. When executed by a processor, the instructions cause the processor to perform operations comprising calculating an index by a processor based upon, at least in part, at least a portion of a plurality of user preferences associated with a computing device. One of a first experience and a second experience may be provided to the computing device based upon, at least in part, the index.

One or more of the following features may be included. Calculating the index may include analyzing one or more responses from one or more users to one or more surveys. Calculating the index may include discarding one or more of the plurality of user preferences associated with the computing device if the one or more of the plurality of the user preferences is less than a sum of a plurality of two or more user preferences of the plurality of user preferences associated with the computing device. Providing to the computing device one of the first experience and the second experience based upon, at least in part, the index may include determining whether the index is above a threshold value. If the index is below the threshold value, the first experience may be provided to the computing device, and if the index is above the threshold value, the second experience may be provided to the computing device. The index may be associated with a profile of the computing device. The profile of the computing device may include a device description repository profile of the computing device. The device description repository profile of the computing device may include a wireless universal resource file profile of the computing device.

In another implementation, a computing system includes a processor and memory configured to perform operations comprising calculating an index by a processor based upon, at least in part, at least a portion of a plurality of user preferences associated with a computing device. One of a first experience and a second experience may be provided to the computing device based upon, at least in part, the index.

One or more of the following features may be included. Calculating the index may include analyzing one or more responses from one or more users to one or more surveys. Calculating the index may include discarding one or more of the plurality of user preferences associated with the computing device if the one or more of the plurality of the user preferences is less than a sum of a plurality of two or more user preferences of the plurality of user preferences associated with the computing device. Providing to the computing device one of the first experience and the second experience based upon, at least in part, the index may include determining whether the index is above a threshold value. If the index is below the threshold value, the first experience may be provided to the computing device, and if the index is above the threshold value, the second experience may be provided to the computing device. The index may be associated with a profile of the computing device. The profile of the computing device may include a device description repository profile of the computing device. The device description repository profile of the computing device may include a wireless universal resource file profile of the computing device.

In one implementation, a method for using a device description repository, performed by one or more computing devices, comprises identifying a plurality of string constants associated with an incoming data request. It is determined whether one or more constants in a user agent string match one of the plurality of string constants. In response to determining that the one or more constants in the user agent string match one of the plurality of string constants, a generic web browser ID is identified as a device description repository ID associated with a device description repository.

One or more of the following features may be included. The generic web browser ID may be identified as the device description repository ID without qualification of at least one of a web browser name and a web browser version. At least a portion of the plurality of string constants may correspond to a single web browser profile in the device description repository. Identifying at least a portion of the plurality of string constants may include at least one of tokenizing one or more user agent strings, patternizing one or more user agent strings, and running a batch of one or more user agents through a set of one or more constants. Running the batch of one or more user agents through the set of one or more constants may include counting a frequency of occurrences of each constant and determining an order of the one or more constants. The generic web browser ID may include at least one of a generic desktop web browser, a generic smart tv web browser, and a gaming console browser. The device description repository may include a wireless universal resource file.

In another implementation, a computer program product resides on a computer readable storage medium that has a plurality of instructions stored on it. When executed by a processor, the instructions cause the processor to perform operations comprising identifying a plurality of string constants associated with an incoming data request. It is determined whether one or more constants in a user agent string match one of the plurality of string constants. In response to determining that the one or more constants in the user agent string match one of the plurality of string constants, a generic web browser ID is identified as a device description repository ID associated with a device description repository.

One or more of the following features may be included. The generic web browser ID may be identified as the device description repository ID without qualification of at least one of a web browser name and a web browser version. At least a portion of the plurality of string constants may correspond to a single web browser profile in the device description repository. Identifying at least a portion of the plurality of string constants may include at least one of tokenizing one or more user agent strings, patternizing one or more user agent strings, and running a batch of one or more user agents through a set of one or more constants. Running the batch of one or more user agents through the set of one or more constants may include counting a frequency of occurrences of each constant and determining an order of the one or more constants. The generic web browser ID may include at least one of a generic desktop web browser, a generic smart tv web browser, and a gaming console browser. The device description repository may include a wireless universal resource file.

In another implementation, a computing system includes a processor and memory configured to perform operations comprising identifying a plurality of string constants associated with an incoming data request. It is determined whether one or more constants in a user agent string match one of the plurality of string constants. In response to determining that the one or more constants in the user agent string match one of the plurality of string constants, a generic web browser ID is identified as a device description repository ID associated with a device description repository.

One or more of the following features may be included. The generic web browser ID may be identified as the device description repository ID without qualification of at least one of a web browser name and a web browser version. At least a portion of the plurality of string constants may correspond to a single web browser profile in the device description repository. Identifying at least a portion of the plurality of string constants may include at least one of tokenizing one or more user agent strings, patternizing one or more user agent strings, and running a batch of one or more user agents through a set of one or more constants. Running the batch of one or more user agents through the set of one or more constants may include counting a frequency of occurrences of each constant and determining an order of the one or more constants. The generic web browser ID may include at least one of a generic desktop web browser, a generic smart tv web browser, and a gaming console browser. The device description repository may include a wireless universal resource file.

The details of one or more implementations are set forth in the accompanying drawings and the description below. Other features and advantages will become apparent from the description, the drawings, and the claims.

BRIEF DESCRIPTION OF THE DRAWINGS

FIG. 9 is an illustrative example of a UA string constant table; and

Like reference symbols in the various drawings indicate like elements.

DETAILED DESCRIPTION OF THE EMBODIMENTS

Figure 1:
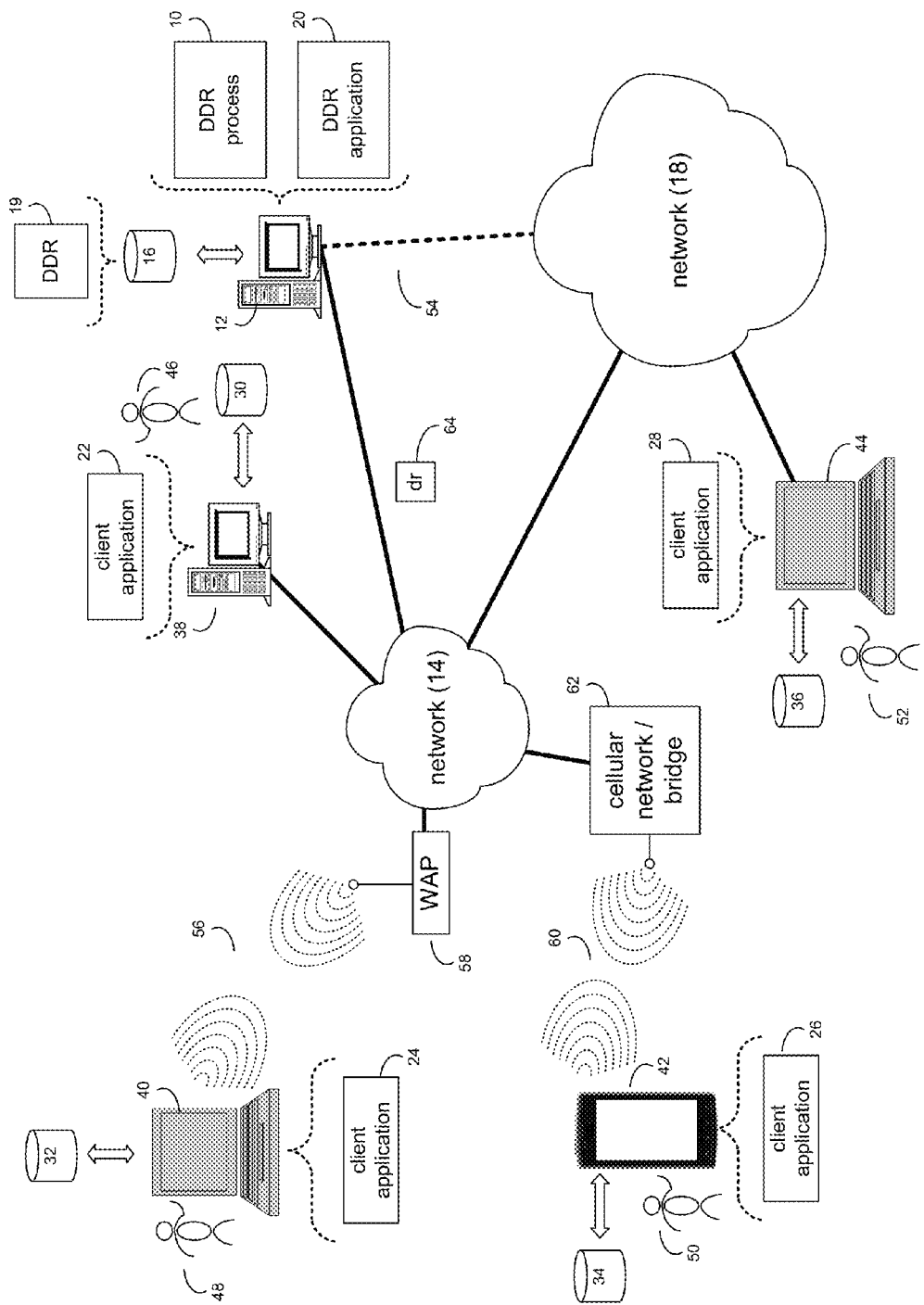
FIG. 1 is an illustrative diagrammatic view of a DDR process coupled to a distributed computing network according to one or more embodiments.

System Overview:

Referring to FIG. 1, there is shown DDR process 10 that may reside on and may be executed by a computer (e.g., client computer 12), which may be connected to a network (e.g., network 14) (e.g., the internet or a local area network). Examples of client computer 12 may include, but are not limited to, a personal computer(s), a laptop computer(s), mobile computing device(s), a server computer, a series of server computers, a mainframe computer(s), or a computing cloud(s). Client computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of DDR process 10, which may be stored on storage device 16 coupled to client computer 12, may be executed by one or more processors (not shown) and one or more memory architectures (not shown) included within client computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Client computer 12 may include a data repository (e.g., device description repository (DDR) 19), such as a database (e.g., relational database, object-oriented database, etc.) and may be located within any suitable memory location, such as storage device 16 coupled to client computer 12. Generally, DDRs may be used, for example, to maintain device information that may be used to detect the capabilities (e.g., properties, attributes, etc.) of client electronic devices (e.g., client electronic devices 38, 40, 42, 44) and the associated run-time application (e.g., run-times) of the client electronic devices. An example of DDR 19 may include but is not limited to Wireless Universal Resource File (WURFL) DDR; however, those skilled in the art will appreciate that other DDRs may also be used without departing from the scope of this disclosure. In some embodiments, client computer 12 may utilize a database management system such as, but not limited to, "My Structured Query Language" (MySQL®) in order to provide multi-user access to one or more databases, such as the above-noted relational database. The data repository may also be a custom database, such as, for example, a flat file database or an XML database. Any other form(s) of a data storage structure and/or organization may also be used. DDR process 10 may be a component of the data repository, a stand alone application that interfaces with the above-noted data repository and/or an applet/application that is accessed via client applications 22, 24, 26, 28. The above-noted data repository may be, in whole or in part, distributed in a cloud computing topology. In this configuration, client computer 12 and storage device 16 may refer to multiple devices, which may also be distributed throughout the network.

Client computer 12 may execute a DDR application (e.g., DDR application 20), an example of which may include, but is not limited to, e.g., a wireless universal resource file (WURFL) application. DDR process 10 and/or DDR application 20 may be accessed via client applications 22, 24, 26, 28. DDR process 10 may be a stand alone application, or may be an applet/application/script that may interact with and/or be executed within DDR application 20. Conversely, DDR application 20 may be a stand alone application, or may be an applet/application/script that may interact with and/or be executed within DDR process 10.

Examples of client applications 22, 24, 26, 28 may include but are not limited to a standard web browser, a mobile web browser, a smart tv web browser, a email client application, a media player application, a game console application, a textual and/or graphical user interface, a customized web browser, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), a television and/or smart television (not shown), a gaming console (not shown), and a dedicated network device (not shown).

One or more of client applications 22, 24, 26, 28 may be configured to effectuate some or all of the functionality of DDR process 10 (and vice versa). Accordingly, DDR process 10 may be a purely server-side application, a purely client-side application, or a hybrid server-side/client-side application that is cooperatively executed by one or more of client applications 22, 24, 26, 28 and DDR process 10.

One or more of client applications 22, 24, 26, 28 may be configured to effectuate some or all of the functionality of DDR application 20 (and vice versa). Accordingly, DDR application 20 may be a purely server-side application, a purely client-side application, or a hybrid server-side/client-side application that is cooperatively executed by one or more of client applications 22, 24, 26, 28 and DDR application 20.

Users 46, 48, 50, 52 may access client computer 12 and DDR process 10 directly through network 14 or through secondary network 18. Further, client computer 12 may be connected to network 14 through secondary network 18, as illustrated with phantom link line 54. DDR process 10 may include one or more user interfaces, such as browsers and textual or graphical user interfaces, through which users 46, 48, 50, 52 may access DDR process 10.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Client electronic devices 38, 40, 42, 44 may each execute an operating system, examples of which may include but are not limited to Android™, Apple® iOS™, Microsoft® Windows®, Linux®, or a custom operating system.

Device & Application Capabilities

As is known in the art, WURFL (i.e., Wireless Universal Resource FiLe) is a Device Description Repository (DDR) that maps HTTP Request headers to the profile of an HTTP client (e.g., a desktop computer, a mobile device, a tablet computer, etc.) that issued the request. The subject matter of the following disclosure may be included within or built upon a WURFL Schema. This may enable DDR process 10 to maintain some level of backward compatibility for users of older Application Programming Interfaces (APIs).

As will also be discussed in greater detail below, according to one or more embodiments, DDR process 10 may enable WURFL to have the capability of distinguishing whether a given capability belongs to a computing device and/or to a run-time. As will also be discussed in greater detail below and according to one or more embodiments of this disclosure, DDR process 10 may enable the detection of new families of, e.g., HTTP clients, as well as distinguish the case in which separate "run-times" (e.g., browsers, multimedia players, etc.) may be running on the same computing device. As will also be discussed in greater detail below, according to one or more embodiments, DDR process 10 may enable at the data level, computing device profiles and run-time profiles to be separated. However, those skilled in the art will recognize that some capabilities may depend on both the computing device and the run-time. Accordingly and in some embodiments, DDR process 10 may query one or more capabilities that may depend on both profiles and may return an appropriate capability value.

Figure 2:
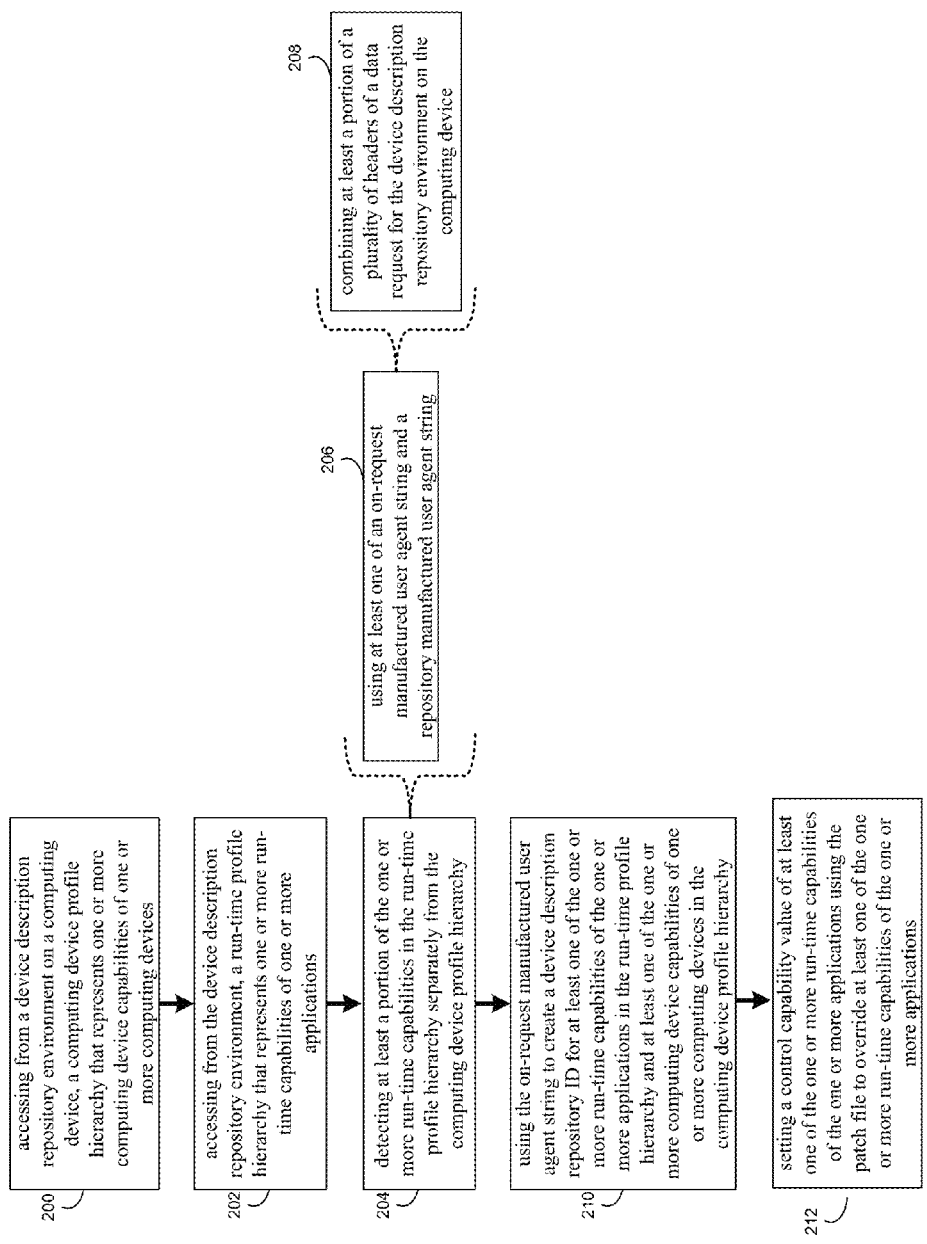
FIG. 2 is an illustrative flowchart of the DDR process of FIG. 1 according to one or more embodiments.
Figure 3:
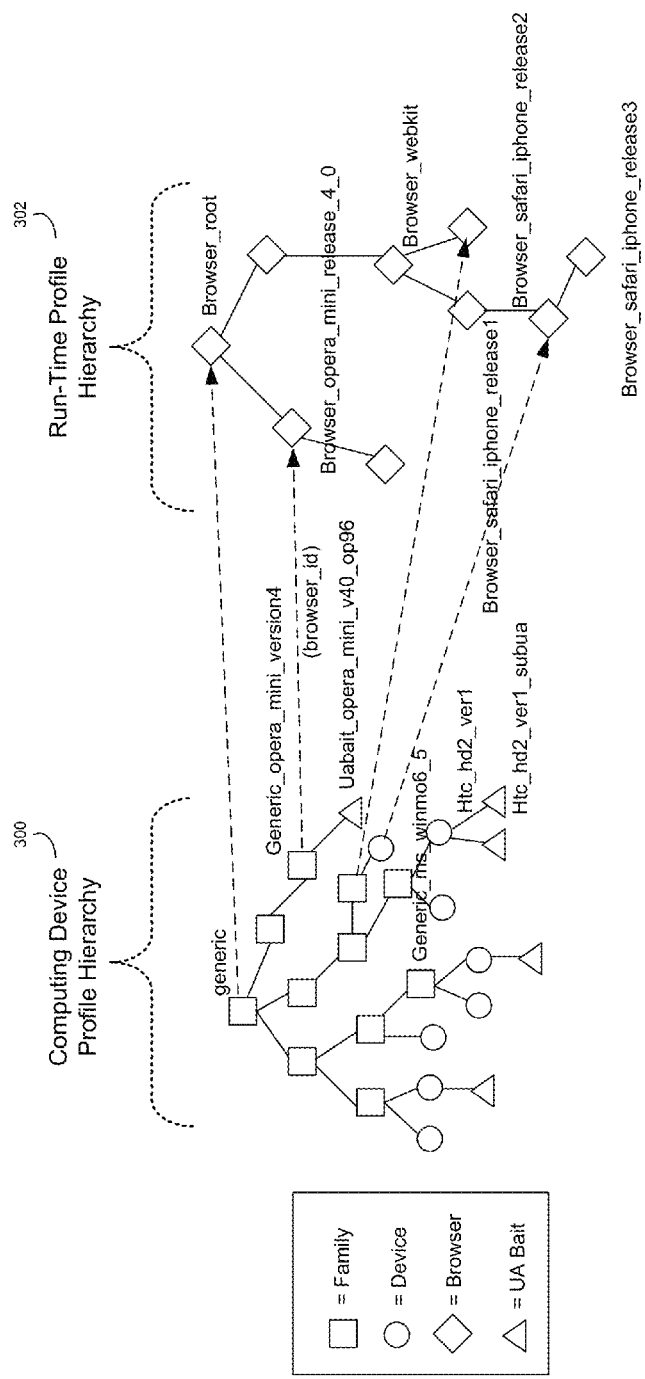
FIG. 3 is an illustrative schematic block diagram of data in a DDR environment according to one or more embodiments.

As discussed above and referring also to FIGS. 2-4, DDR process 10 may access 200, from a DDR environment (e.g., DDR 19) on a computing device (e.g., client computer 12), a computing device profile hierarchy (e.g., computing device profile hierarchy 300) that may represent one or more computing device capabilities (e.g., screen size, device model/name) of one or more computing devices (e.g., client electronic devices 38, 40, 42, 44). A run-time profile hierarchy (e.g., run-time profile hierarchy 302) that may represent one or more run-time capabilities of one or more applications (e.g., browsers, multimedia players, etc.) may be accessed 202 from DDR process 10 in DDR 19.

At least a portion of the one or more run-time capabilities in run-time profile hierarchy 302 may be detected 204 by DDR process 10 (e.g., via an API) separately from computing device profile hierarchy 300. For example, detection 204 may be accomplished by DDR process 10 adding run-time profile hierarchy 302 as a new hierarchy of profiles, separated from computing device profile hierarchy 300. Additionally/alternatively, detection 204 may be accomplished by DDR process extending an existing WURFL schema to represent the new hierarchy of profiles.

For example and according to one or more embodiments, DDR process 10 may implement an ID Tracking function to perform associations between an HTTP request from e.g., client electronic device 42 and one or more WURFL IDs such that a "capability value function" via DDR process 10 may allow the detection 204 of Run-Time capabilities (e.g., browser capabilities) separately from the underlying computing device.

Assume for illustrative purposes that client electronic device 42 would like to access content (e.g., one or more web pages) available from client computer 12. Therefore, client electronic device 42 may issue data request 64 for the desired content to client computer 12. Accordingly and in order to effectuate access to such content, DDR process 10 may tailor the content requested by and provided to client electronic device 42 (from client computer 12) so that such content is properly displayed on client electronic device 12. Upon receiving data request 64, DDR process 10 may process data request 64 to e.g., examine the headers included therein to identify various keywords within data request 64 that may be indicative of various computing device capabilities (for e.g., client electronic device 42) and various run-time capabilities (e.g., opera mini browser version 6.4).

As stated above, DDR process 10 may access 200 (from device description repository environment 19 on client computer 12) computing device profile hierarchy 300 that represents e.g., one or more computing device capabilities of one or more computing devices. Further and as stated above, DDR process 10 may access 202 (from device description repository environment 19 on client computer 12) run-time profile hierarchy 302 that represents e.g., one or more run-time capabilities of one or more applications.

Accordingly, DDR process 10 may compare the above-described keywords included within the headers of data request 64 to various entries within computing device profile hierarchy 300 and run-time profile hierarchy 302 to determine which (if any) matches occur. In the event that there are no matches between the above-described keywords and the various entries included within computing device profile hierarchy 300 and run-time profile hierarchy 302, a generic hardware and software configuration maybe utilized (e.g., in a fashion similar to the way that earlier versions of Microsoft Windows used to use a generic VGA driver when a vendor specific VGA driver could not be identified for a specific video card). However, for situation in which matches have been identified, those matches may be utilized to detect 204 one or more run-time capabilities (in run-time profile hierarchy 302) separately from computing device profile hierarchy 300.

When detecting 204 the one or more run-time capabilities separately from computing device profile hierarchy 300, DDR process 10 may use 206 at least one of an on-request manufactured user agent (OMUA) string and a repository manufactured user agent (RMUA) string. For example, DDR process 10 may combine 208 at least a portion of the above-described headers of data request 64 for device description repository environment 19.

As discussed above, DDR process 10 may compare the above-described keywords included within the headers of data request 64 to various entries within computing device profile hierarchy 300 and run-time profile hierarchy 302 to determine which (if any) matches occur. In the event that matches were found between the above-described keywords and computing device profile hierarchy 300, DDR process 10 may utilize these matches to form the above-described on-request manufactured user agent string. Further, in the event that matches were found between the above-described keywords and run-time profile hierarchy 302, these matches may be utilized to form the above-described repository manufactured user agent string.

For example, DDR process 10 may utilize 210 the above-described on-request manufactured user agent string to create a device description repository ID for one or more of the run-time capabilities of the one or more applications in the run-time profile hierarchy and at least one of the one or more computing device capabilities of one or more computing devices in the computing device profile hierarchy.

An example of such a device description repository ID may include, but is not limited to, a wireless universal resource file (WURFL) ID. Such a device description repository ID may be utilized by DDR process 10 to define a technical profile for the device associated with the device description repository ID. An example of such a device description repository ID and the corresponding technical profile is as follows:

```
<device id="apple_iphone_ver1"
    user_agent="Mozilla/5.0 (iPhone; U; CPU like Mac OS X; en)
AppleWebKit/420+ (KHTML, like Gecko)
        Version/3.0 Mobile/1A538a Safari/419.3"
    fall_back="apple_generic"
    actual_device_root="true">
  <group id="product_info">
    <capability name="browser_id"
value="browser_webkit_iphoneos_1"/>
    :
  </device>
```

Within the above-described description repository ID and the corresponding technical profile, the relationship between a device profile (in computing device profile hierarchy 300) and the corresponding run-time profile (in run-time profile hierarchy 302) may be established by DDR process 10 through e.g., a browser_id entry. For example, the browser_id entry may link a <device> with a special browser (or other run-time application running on the device in question).

Those skilled in the art will appreciate that other run-times (applications), such as Opera Mini, may be identified by DDR process 10 in a similar manner to that described above. As such, the above programming logic should be taken as an example only and not to limit the scope of the disclosure.

One of more of the above-described run-time capabilities and/or computing device capabilities may include a virtual capability (VC). For example, virtual capabilities (VCs) may be capabilities whose value is calculated by DDR process 10 dynamically each time based on a data request (e.g., HTTP request), as opposed to being a static capability. The calculation of these virtual capabilities may be a function of all HTTP headers, the matched client electronic device, and the value of regular capabilities.

Examples of such virtual capabilities may include but are not limited to:
  virtual_is_mobile_device: Apply heuristics to discover whether a device is a mobile device;
  virtual_is_desktop_browser: Apply heuristics to discover whether a device is a desktop device;
  virtual_is_crawler: Apply heuristics to detect main bots and crawlers;
  virtual_is_transcoder: Apply heuristics to detect transcoders (in addition to WURFL "is_transcoder");
  virtual_language_code: Apply heuristics to detect language code (e.g., de-de) out of UA string and/or Accept header;
  virtual_android_os_version: Find Android OS version based on UA string analysis;
  virtual_blackberry_os_version: Find RIM OS version based on UA string and UAProf URL analysis;
  virtual_symbian_os_version: Find Symbian OS version based on UA string;
  virtual_iphone_os_version: Find iPhone OS Version based on UA string;
  virtual_opera_mini_version: Find OperaMini version based on UA string;
  virtual_max_image_width: find max_image_width, but override with header info for Windows Mobile devices and OperaMini;
  virtual_max_image_height: find max_image_height, but override with header info for Windows Mobile devices and OperaMini.

Figure 4:
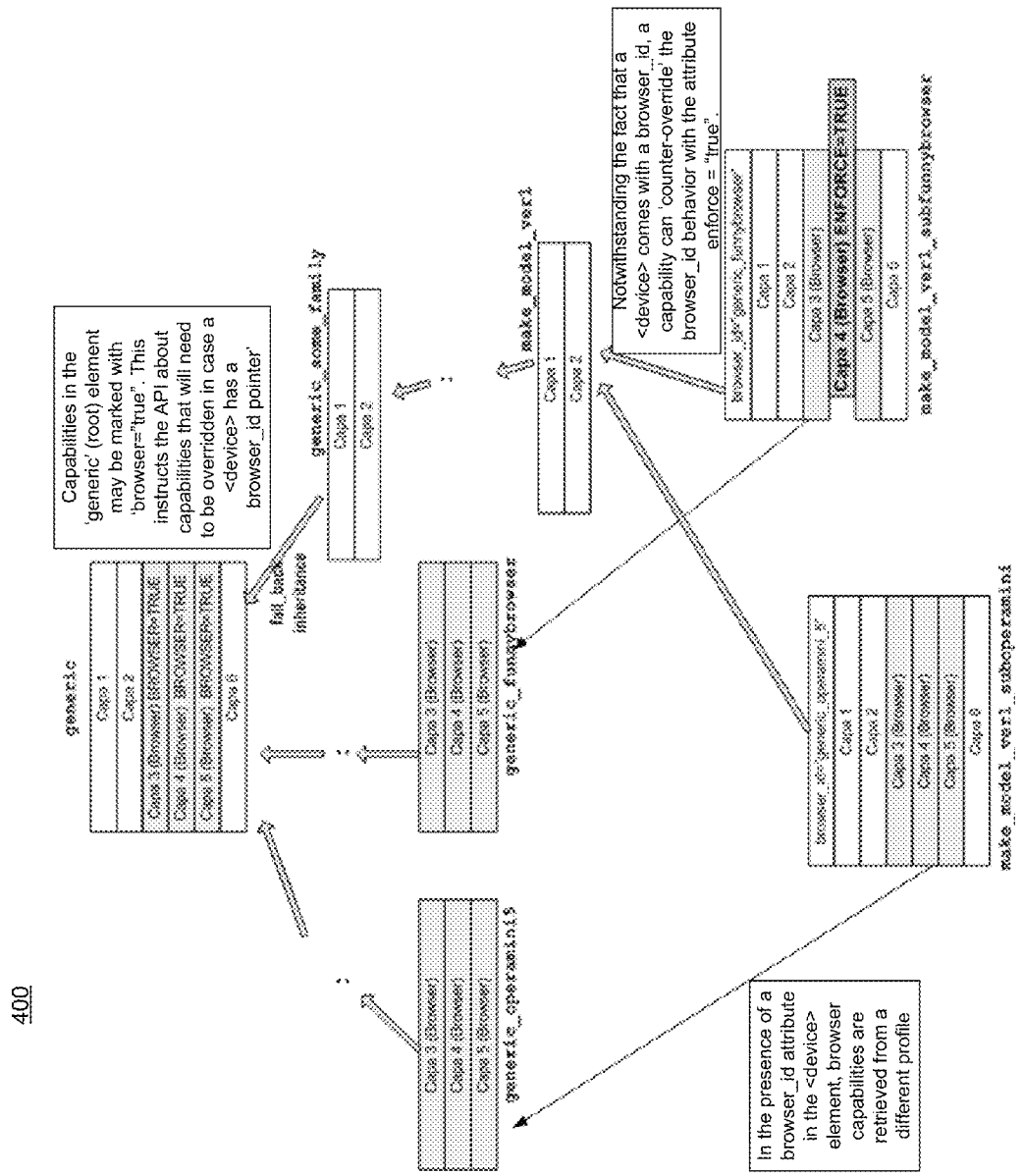
FIG. 4 is an illustrative schematic block diagram of DDR process 10 overriding one or more capabilities according to one or more embodiments.

Referring at least to diagram 400 in FIG. 4, DDR process 10 may set 212 a control capability value of the one or more run-time capabilities of the one or more applications using a patch file to override at least one of the run-time capabilities of the one or more applications. For example, a user (via DDR process 10) may override (via a patch file) the default value within e.g., computing device profile hierarchy 300 and/or run-time profile hierarchy 302. Accordingly, if e.g., an application ordinarily does not have a certain capability but the user wants such a capability, the user (via DDR process 10) may override the default run-time capability of the application so that such a capability is available. Additionally/alternatively, DDR process 10 may allow a user (via an API) to remove the need for the use of a patch file by e.g., allowing the user to select the availability of such a capability.

According to one or more embodiments, the following example illustrates how a VC might be implemented by DDR process 10 to return the value of a capability, which, in the case of Opera-Mini, may be handled by the corresponding value in one of the Opera Mini profiles:

```
$wurflInfo = $wurflManager->getWURFLInfo( );
// You can now query wurfl for a device
// By HttpRequest
$device = $wurflManager->getDeviceForHttpRequest($_SERVER);
//capture some regular device capabilities first
$deviceId = $device->id;
$brandName = $device->getCapability("brand_name");
$modelName = $device->getCapability("model_name");
$resolutionWidth = $device->getCapability("resolution_width");
$resolutionHeight = $device->getCapability("resolution_height");
//capture virtual  capabilities (observe the need for the original HTTP request)
$preferredMarkup = $device->getVirtualCapability("preferred_markup", $_SERVER);
```

According to one or more embodiments, a VC may use the original HTTP request, because certain capabilities may need to be retrieved from run-time profile hierarchy 302 and/or from other heuristics. As a general example using pseudocode, no NULL checking:

```
public function getVirtualCapability($capabilityName, $httpRequest) {
//check existence of function "getVirtual*CapabilityName*( )".
//if it does not exist: fail. Otherwise invoke function
return getVirtualXhtmlPreferredMarkup($this, $httpRequest);
}
function getVirtualPreferredMarkup($device, $httpRequest);
$ua = $httpRequest['HTTP_USER_AGENT'];
$wurflID = $this -> id;
//if UA string contains "generic", then retrieve info from its browser profile
  if (isOperaMini($httpRequest)) {
    $operaMiniProfile = getOperaMiniProfile($httpRequest);
    return $operaMiniProfile -> getCapability("preferred_markup");
  } else {
    //assuming Opera Mini is the only run-time we need to manage specially
    //skyfire and other may be added in the future
    $browserId = $device -> getCapability("browser_id");;
    $browserProfile = $wurflManager->getDevice($browserId);
    return $browserProfile -> getCapability("preferred_markup");
  }
}
```

User-Preference Capabilities

As is known in the art, WURFL and other DDRs may be able to collect objective "testable" capabilities (e.g., screen size, support for a certain CSS property, support for a certain video codec, etc.). The objective capabilities, in essence, may be properties that, given a mobile device and a test, may be immediately measurable and/or verifiable for that device.

DDR process 10 may be configured to gather information regarding "subjective device capabilities". Subjective device capabilities may broadly be described as capabilities that measure the perception of certain qualities by device users (e.g., user 50 of client electronic device 42). For example, a subjective device capability may be how happy user 42 is with one or more user experiences associated with client electronic device 42 and/or one or more features and/or third-party services accessed by client electronic device 42. As will be discussed in greater detail below, the subjective device capabilities may not be collected by a single tester or by many testers together. Conversely, the subjective device capabilities may be gathered by DDR process 10 and expressed via an index (e.g., a number) that may indicate the collective level of appreciation of a certain abstract feature of the client electronic device. As will be discussed in greater detail below, the above-described index may be determined by DDR process 10 based upon responses to certain surveys provided by, e.g., anonymous users of the mobile web.

For example, assume that e.g., client electronic device 42 (such as an iPhone and/or Android device) may generally display regular web content. Accordingly, users (e.g., user 50) of such a device may want full-web content delivered to those devices. However, this may not always be desirable, as full-web content is often too large and/or too complex to be rendered on such devices. Accordingly, the overall user-experience on such a mobile device may be less than desirable. Therefore, websites may offer a mobile-optimized user-experience to mobile users. However, some mobile users may still prefer the mobile-optimized, user-experience regardless of the ability of their device being capable of receiving and processing full-web content. Accordingly, DDR process 10 may be configured to measure such a preference via an index (e.g., a Full Web Usability Index or FWUI).

Figure 5:
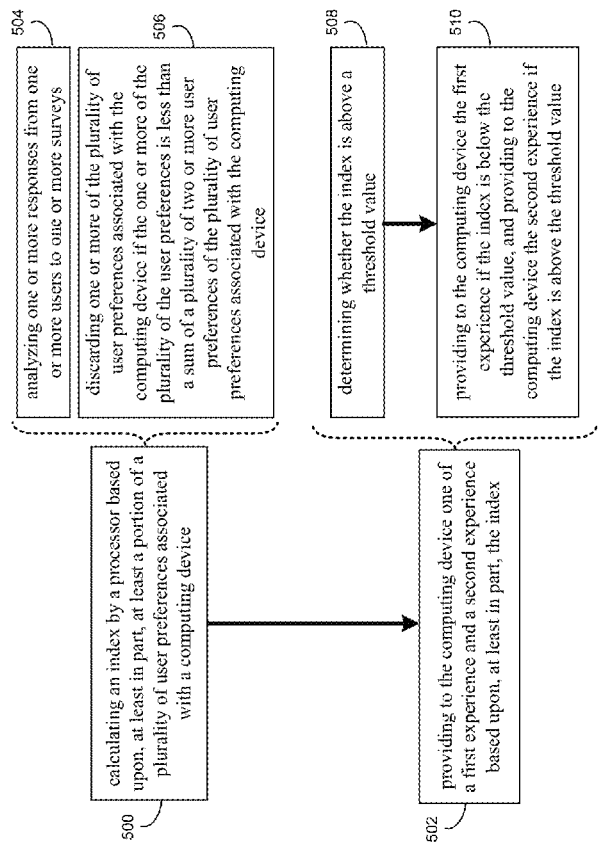
FIG. 5 is an illustrative flowchart of the DDR process of FIG. 1 according to one or more embodiments.

As discussed above and referring also to FIGS. 5-7, DDR process 10 may calculate 500 the above-described index based upon, at least in part, a plurality of user preferences associated with a computing device (e.g., client electronic device 42), wherein DDR process 10 may provide 502 one of a first experience (e.g., a mobile experience) and a second experience (e.g., a desktop experience) to the computing device (e.g., client electronic device 42) based upon, at least in part, the above-described index.

Specifically, DDR process 10 may analyze 504 one or more responses from one or more users (e.g., users 46, 48, 50, 52) to one or more surveys (e.g., survey 600) to calculate 500 index 700. For example, DDR process 10 may render survey 600 for user 50 within window 602 on client electronic device 42. Window 602 may include e.g., a pop-up window rendered by DDR process 10 as a result of user 42 selecting a link (e.g., advertisement) from a web page. Additionally/alternatively, window 602 may be a separate web page.

DDR process 10 may detect the type of client electronic device via the above-described on-request manufactured user agent string and may inquire concerning e.g., the type of content to be delivered to the client electronic device. Further, DDR process 10 may collect answers to the above-described inquiry and these answers may be used by DDR process 10 to calculate 500 the Full Web Usability Index. DDR process 10 may be configured to compartmentalize answers to the above-described inquiry in accordance with the specific device being utilized by the user. For example, users of an iPhone™ may wish to receive mobile content, due to the iPhone's inability to process Flash™ content, while users of Android™ devices may wish to receive full-web content, due to the Android device's ability to process Flash content.

Index 700 may be an integer value having a range of e.g., −100 to +100, wherein −100 may broadly indicate "everyone prefers a mobile experience for this device" and +100 may broadly indicate "everyone prefers a full desktop web experience for this device". A zero (0) may indicate that users are more or less equally split between the mobile experience and the full desktop web experience.

While querying information about whether a device is a mobile device may be sufficient in some instances, other instances in which e.g., smart TVs, mobile devices with large screens, and tablets are available with different screen sizes, user-preferences (and index 700) may vary greatly between devices. Once index 700 is calculated 500, DDR process 10 may provide 502 one of the mobile experience or the desktop experience (or combinations thereof) to client electronic device 42 based upon index 700.

For example, if index 700 has a value of zero or greater, the full desktop experience may be provided by DDR process 10, while index 700 having a value of less than zero may result in the mobile experience being provided by DDR process 10.

For example, DDR process 10 may determine 508 whether index 700 is above a threshold value (e.g., zero). If index 700 is above this threshold value, DDR process 10 may automatically (e.g., by associating index 700 with the above-noted profile of client electronic device 42) provide 510 a desktop experience to client electronic device 42. Conversely, if index 700 is below this threshold value, DDR process 10 may automatically provide 510 a mobile experience to client electronic device 42.

For example, DDR process 10 may provide 502 full desktop web content to devices that score 70 or more (e.g., on the −100 to 100 scale) for complex websites. As another example, DDR process 10 may provide 502 devices which score above 20 for simpler websites with the full desktop experience, even when a user may be using a mobile device. As another example, DDR process 10 may provide 502 devices accessing any website that scores less than −70 with the mobile experience.

According to one or more embodiments, DDR process 10 may provide index 700 to, e.g., a webmaster of a complex website, who by example may only decide to serve full desktop web content to devices that score 70 (e.g., on the −100 to 100 scale) or more. As another example, a webmaster of a simpler website may decide that everything above 20 qualifies for the full desktop experience, even when a user may be using a mobile device. As another example, a webmaster of any website for a device that scores less than −70 may be provided with the mobile experience.

Figure 6:
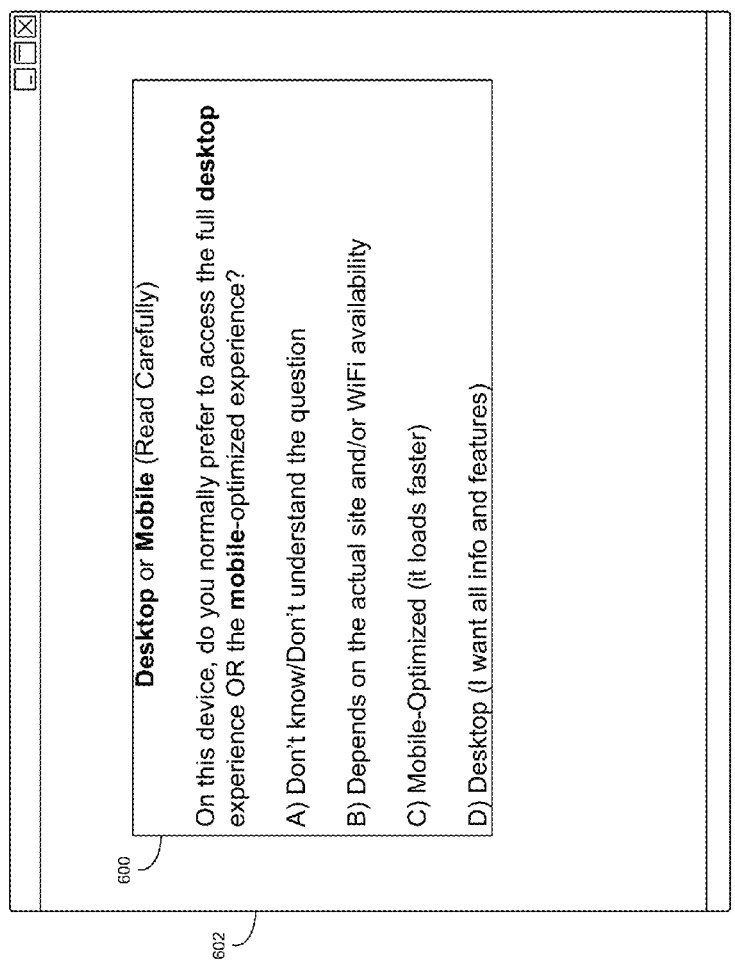
FIG. 6 is an illustrative diagrammatic view of a screen image displayed by the DDR process of FIG. 1 according to one or more embodiments.
Figure 7:
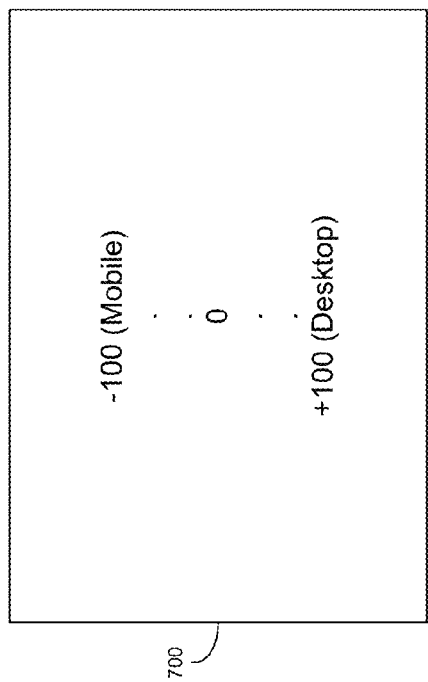
FIG. 7 is an illustrative index example of the DDR process of FIG. 1 according to one or more embodiments.

As shown in FIG. 6, assume that survey 600 asks respondents to select one of four possible answers (namely A, B, C, D), wherein Answer A indicates that the respondent did not understand the question; Answer B indicates that the respondent did not think their answer is dependent upon the particular website in question; Answer C indicates that the respondent prefers a mobile experience, and Answer D indicates that the respondent prefers a full desktop experience.

Those skilled in the art will recognize that varying questions and response types may also be used without departing from the scope of the disclosure. For example, a question on survey 600 may be, "On a scale of one to five, how happy are you with your device overall user-experience?". As such, the description of the specific questions and response type described should be taken as an example only and not to limit the scope of the disclosure.

DDR process 10 may calculate 500 index 700 by, e.g., discarding 506 one or more user preferences (from all respondents) that are associated with client electronic device 42 if the preference being discarded is less than the sum of two or more user preferences (from all respondents) of the plurality of user preferences associated with client electronic device 42. For example, preference B may be normally discarded, unless e.g., the number of people that selected preference B outnumbers the sum of the number of people that selected preference C & D.

In such a situation, preferences C & D may be used to calculate index 700 according to the following formula:

if B<C+D, then FWUI=(D/(D+C))*200)-100(resulting in a number between -100 and +100)

Therefore, if D=80 & C=100:

FWUI=(80/(80+100))*200)-100→-11.11

While index 700 may include, for example, an integer, those skilled in the art will appreciate that other ways of expressing index 700 (e.g., non-integer values) may also be used without departing from the scope of the disclosure. Similarly, the example of index 700 spanning -100 to +100 should be taken as an example only and not to limit the scope of the disclosure.

While examples may be disclosed of DDR process 10 using index 700 to measure subjective device capabilities to determine whether a mobile experience or a desktop experience is provided 502 to client electronic device 42, those skilled in the art will appreciate that DDR process 10 may use index 700 to measure subjective device capabilities to determine whether other experiences may be provided 502 to client electronic device 42 without departing from the scope of the disclosure. For example, DDR process 10 may use index 700 to measure subjective device capabilities to determine user-perceived qualities of such things as support of JQuery® Mobile, Sencha® Touch, social media features, as well as the user-perceived qualities of other third-party services. As such, any description of DDR process 10 using index 700 to measure subjective device capabilities to determine whether a mobile experience or a desktop experience is provided 502 to client electronic device 42 should be taken as an example only and not to limit the scope of the disclosure.

Fast Detection

As will be discussed in greater detail below, DDR process 10 may be used at least in two-different modes. For instance, one mode may be "high performance" (e.g., detect desktop web browsers in a fast, (nearly) purely algorithmically manner, and without allocating additional memory for subsequent UA string associations. UA strings detected by DDR process 10 as desktop web browsers may be identified 804 by DDR process 10 as a DDR ID (e.g., WURFL ID) such as "generic_web_browser". DDR process 10 may identify 804 generic_web_browser without further qualification of the desktop web browser name or the desktop web browser version. The generic web browser ID may include browsers other than desktop browsers, such as, for example, at least one of a generic desktop web browser, a generic smart tv web browser, and a gaming console browser.

DDR process 10 may be used in a second example mode as "high accuracy" (e.g., desktop UA matchers may still be run on each request and a profile may be managed in memory for each request).

As will also be discussed in greater detail below, DDR process 10 may execute a function (e.g., "isDesktopBrowserHeavyDutyAnalysis") and accordingly may identify 800 certain keywords and/or patterns (e.g., constants) in the UA string associated with an incoming data request. Based at least in part on the identified 800 constants, DDR process 10 may determine 802 with a reasonable degree of certainty whether the UA string is a desktop web browser UA string. DDR process 10 may, in response to determining 802 that the string constants in the user agent string match one of the plurality of string constants, identify 804 the above-noted generic web browser ID as the above-noted device description repository ID associated with device description repository 19 (e.g., a WURFL repository). Additionally, in response to identifying 804 the above-noted generic web browser ID as the above-noted device description repository ID, DDR process 10 may proceed to skip the above-noted traditional WURFL matching mechanism and memory allocation procedures.

For example, DDR process 10 may implement one or more categorization functions (e.g., isMobileBrowser( ), isDesktopBrowser( ) and isSmartTV( ) . . . and isDesktopBrowserHeavyDutyAnalysis( )( )). These functions may be used by DDR process 10 to identify the most common cases of UA strings that may belong to mobile devices, desktop devices, smartTVs, or other client electronic devices.

These functions may be used by DDR process 10 via the implementation of the API to partition the above-noted matchers that may be applied to a UA string to find the DDR ID (e.g., a WURFL ID). For instance, mobile matchers may not be applied to a UA string that has already been ascertained by DDR process 10 as a desktop web browser.

Desktop web browsers may optionally (e.g., at the discretion of the programmer) be handled by DDR process 10 via a simplified desktop matcher which may collapse at least a portion of the UA strings in their associated entries into, for example, one single web browser profile (e.g., in DDR repository 19). Accordingly, cache and memory space may not be consumed by using separate web browser profiles for each entry.

Figure 8:
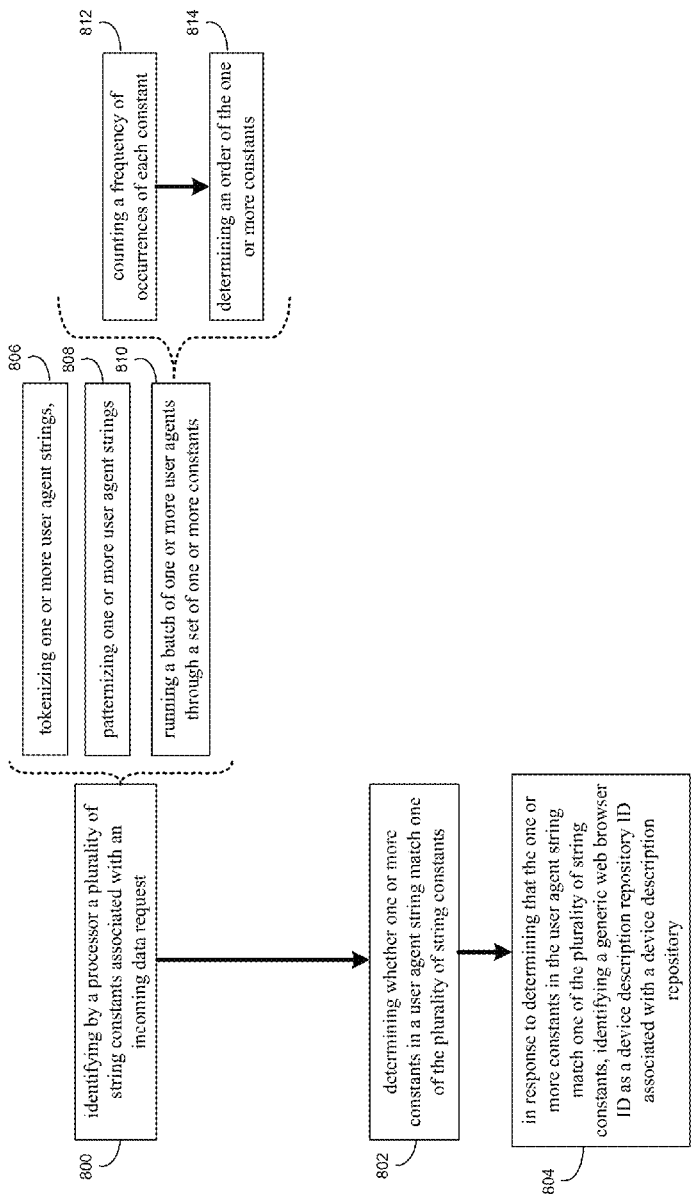
FIG. 8 is an illustrative flowchart of the DDR process of FIG. 1 according to one or more embodiments.

As discussed above and referring also to FIGS. 8-9, DDR process 10 may identify 800 a plurality of string constants associated with an incoming data request. For example, to calculate one or more of the above-noted functions, DDR process 10 may identify 800 a group of string constants. Non-limiting examples of different groups of string constants are illustrated in a table 900 in FIG. 9.

The groups of string constants in table 900 may be used by DDR process 10 to calculate the following example functions: isMobileBrowser(HttpRequest); isSmartTV (HttpRequest); isDesktopWebBrowser(HttpRequest). Accordingly, DDR process 10 may use these functions to prepare the work for one or more matchers that may follow.

DDR process 10 may determine 802 whether one or more constants in the above-noted UA string match one of the plurality of string constants in table 900. For example, isSmartTV( ) may be implemented by DDR process 10 to identify whether the UA string contains one of the example smartTV constants noted above. For example:

```
public static function isSmartTV(HttpRequest $httpRequest) {
    if                          ($httpRequest->user_agent-
>iContains(WurflConstants::$SMARTTV_BROWSERS)) return true;
    return false;
}
```

Additionally/alternatively, DDR process 10 may via iContains (discussed below) match a list of substrings against the UA string.

Additionally/alternatively, isDesktopWebBrowser ( ) may be implemented by DDR process 10 to identify whether the UA string contains one of the example desktop constants noted above. For example:

```
public static function isDesktopBrowser(HttpRequest $httpRequest) {
    if              ($httpRequest->user_agent-
>iContains(WurflConstants::$DESKTOP_BROWSERS)) return true;
        return false;
    }
```

Additionally/alternatively, isMobileBrowser ( ) may be implemented by DDR process 10 by first evaluating isDesktopBrowser( ). In the example, if the device is found to be a desktop without a doubt, then the device may be identified by DDR process 10 as being non-mobile.

The list of Mobile Constants noted above may be evaluated by DDR process 10. For example, if there is a match, then the UA may be identified by DDR process 10 to be a mobile device (at least for the purpose of optimizing matchers). If the UA string matches the /\d\d\d[xX\*]\d\d\d\d?\b/ regular expression (e.g., ";320×240", "480×800", "800*1024"), then the device may be identified by DDR process 10 as being mobile. This check may be implemented by DDR process 10 at least because some Windows devices and other exotic devices may carry the screen size in the UA string. If all else fails, DDR process 10 may identify the UA as non-mobile (e.g., for the purpose of matchers). For example:

```
public static function isMobileBrowser(HttpRequest $httpRequest) {
    if (self::isDesktopBrowser($httpRequest)) {
        return false;
    }
    if              ($httpRequest->user_agent-
>iContains(WurflConstants::$MOBILE_BROWSERS)) return true;
    if              ($httpRequest->user_agent-
>regexContains('/[^\d]\d{3}x\d{3}/')) return true;
        return false;
}
```

DDR process 10 may (via a DDR API) use one or more (e.g., the above-noted three) sets of keywords to filter user agents through three corresponding matching systems (e.g., desktop browsers, mobile browsers and smartTVs). During analysis, DDR process 10 (via a user agent) may flow through one or more of these matching systems depending at least in part on the keywords (e.g., string constants) matches. As noted above, the keywords may be, for example, words and/or phrases that generally only occur in their category of user agents. For instance, a user agent containing "SonyDTV" (noted in table 900) may flow through the SmartTV matching system.

DDR process 10 may identify 800 the plurality of string constants using one or more techniques, which may include at least one of tokenizing 806 one or more UA strings, patternizing 808 one or more UA strings, and running 810 a batch of one or more UAs through a set of one or more constants.

For example, tokenizing 806 UA strings may include DDR process 10 splitting the UA strings up into individual words that may be known to belong to a single category of devices, and counting their frequency of occurrence. Patternizing 808 UA strings may include may include DDR process 10 programmatically removing variable portions of the UA (e.g., version numbers and model names), thus drawing attention to the non-variable keywords. Running 810 a batch of one or more user agents through the set of one or more constants may include DDR process 10 counting 812 a frequency of occurrences of each constant and determining 814 an order of the one or more constants.

For example, counting 812 the above-noted frequency of occurrences of each constant may include cases where more than one constant may match a single UA. Accordingly, DDR process 10 may use the totals to determine the optimal order of the constants and which constants may be unnecessary after optimization.

According to one or more embodiments, if an http request contains a UAProf 'x-wap-profile' header with a valid HTTP url value, then DDR process 10 may return false (and let regular DDR matching takeover). If Smart TV constants are detected, then DDR process 10 may return false. If UA contains Chrome and not "Ventana", DDR process 10 may return true. If mobile constants are detected, then DDR process 10 may return false. If UA contains "PPC", DDR process 10 may return false. If UA contains "Firefox" and does NOT contain "Tablet", DDR process 10 may return true (and let the API return the above-noted "generic_web_browser" as the DDR ID). If UA matches the following Safari Desktop RegEx:

```
^Mozilla/5\.0   \((?:Macintosh|Windows)[^\)]+\)    AppleWebKit/[\d\.]+
\(KHTML, like Gecko\) Version/[\d\.]+ Safari/[\d\.]+$
``` then DDR process 10 may return true. If the UA starts with 'Opera/9.80 (Windows NT' or 'Opera/9.80 (Macintosh', then DDR process 10 may return true. If Desktop Browser Constants are detected, DDR process 10 may return true. If the UA string matches one of the following two regular expressions, DDR process 10 may return true: '/^Mozilla\/5\.0 \(compatible; MSIE 9\.0; Windows NT \d\.\d/', '/^Mozilla\/4\.0\(compatible; MSIE \d\.\d; Windows NT \d\.\d/'. For example:

```
public              static              function
isDesktopBrowserHeavyDutyAnalysis(TeraWurflHttpRequest
$httpRequest){
    $user_agent = $httpRequest->user_agent;
    // Check UAProf
    if ($httpRequest->uaprof instanceof TeraWurflUserAgentProfile
    && $httpRequest->uaprof->containsValidUrl( )) return false;
    // Chrome
    if    ($user_agent->contains('Chrome')    &&    !$user_agent-
>contains('Ventana')) return true;
    // Check mobile keywords
    if                                               ($user_agent-
>iContains(WurflConstants::$MOBILE_BROWSERS)) return false;
    // Check Smart TV keywords
    if                                               ($user_agent-
>iContains(WurflConstants::$SMARTTV_BROWSERS)) return false;
    if ($user_agent->contains('PPC')) return false; // PowerPC; not
always mobile, but we'll kick it out of SimpleDesktop and match it in the
WURFL DB
    //   Firefox;   fennec   is   already   handled   in   the
WurflConstants::$MOBILE_BROWSERS keywords
    if    ($user_agent->contains('Firefox')    <&&    !$user_agent-
>contains('Tablet')) return true;
    // Safari
    if              ($user_agent->regexContains('#^Mozilla/5\.0
\((?:Macintosh|Windows)[^\)]+\) AppleWebKit/[\d\.]+ \(KHTML, like
Gecko\) Version/[\d\.]+ Safari/[\d\.]+$#')) return true;
    // Opera Desktop
    if ($user_agent->startsWith(array('Opera/9.80 (Windows NT',
'Opera/9.80 (Macintosh'))) return true;
    // Check desktop keywords
    if                                             ($user_agent-
>iContains(WurflConstants::$DESKTOP_BROWSERS)) return true;
    if ($user_agent->regexContains(array(
        // Internet Explorer 9
        '/^Mozilla\/5\.0  \(compatible;  MSIE  9\.0;  Windows  NT
\d\.\d/',
        // Internet Explorer <9
```

```
'/ Mozilla\/4\.0 \(compatible; MSIE \d\.\d; Windows NT
\d\.\d/',
        ))) return true;
        return false;
}
```

DDR process 10 may analyze a AU string and return the correct device string via a getDeviceOSVersion( ) function. DDR process 10 may use extra device-specific logic to extract the model name (which may be accompanied by the brand name) from the UA string. DDR process 10 may use the extra device-specific logic to capture the model and/or brand name, as well as a few common cases. For instance, some non-limiting examples from multiple manufacturers that may ship Android devices may include:

Mozilla/5.0 (Linux; U; Android 1.6; el-gr; SonyEricssonX10i Build/R2BA026) AppleWebKit/528.5+ (KHTML, like Gecko) Version/3.1.2 Mobile Safari/525.20.1

Mozilla/5.0 (Linux; U; Android 1.6; en-au; Behold2 Build/DONUT) AppleWebKit/528.5+ (KHTML, like Gecko) Version/3.1.2 Mobile Safari/525.20.1

Mozilla/5.0 (Linux; U; Android 2.1-update1; fr-ca; SAMSUNG-SGH-I896 Build/ECLAIR) AppleWebKit/530.17 (KHTML, like Gecko) Version/4.0 Mobile Safari/530.17

Mozilla/5.0 (Linux; U; Android 2.1-update1; fr-ch; HTC Hero Build/ERE27) AppleWebKit/530.17 (KHTML, like Gecko) Version/4.0 Mobile Safari/530.17

In the above examples, the underlined parts may be what DDR process 10 intends to capture with a regular expression with the objective of identifying, e.g., SonyEricssonX10i, Behold2, SAMSUNG-SGH-1896, HTC Hero, respectively. According to one or more embodiments, if DDR process 10 encounters a UA string which is not well-formed, DDR process 10 via the getDeviceOSVersion( ) function may return an empty string (''), to signal that this is not a standard Android UA string.

There are some UAs that respect the schema above, BUT still require extra 'massaging' of the model name. For example:

Mozilla/5.0 (Linux; U; Android 1.5; cs-cz; HTC Magic Build/CUPCAKE) AppleWebKit/528.5+ (KHTML, like Gecko) Version/3.1.2 Mobile Safari/525.20.1

Mozilla/5.0 (Linux; U; Android 1.5; en-in; HTC_Magic Build/CUPCAKE) AppleWebKit/528.5+ (KHTML, like Gecko) Version/3.1.2 Mobile Safari/525.20.1

Mozilla/5.0 (Linux; U; Android 2.1-update1; es-us; HTC-A6366/1.0 Build/ERE27) AppleWebKit/530.17 (KHTML, like Gecko) Version/4.0 Mobile Safari/530.17

Mozilla/5.0 (Linux; U; Android 2.1-update1; el-gr; HTC Wildfire Build/ERE27) AppleWebKit/530.17 (KHTML, like Gecko) Version/4.0 Mobile Safari/530.17

Mozilla/5.0 (Linux; U; Android 2.1-update1; de-ch; HTC Wildfire 1.29.163.1 Build/ERE27) AppleWebKit/530.17 (KHTML, like Gecko) Version/4.0 Mobile Safari/530.17

Mozilla/5.0 (Linux; U; Android 2.3.5; es-es; HTC/DesireS/2.10.161.3 Build/GRJ90) AppleWebKit/533.1 (KHTML, like Gecko) Version/4.0 Mobile Safari/533.1

Mozilla/5.0 (Linux; U; Android 2.3.3; en-au; HTC_A510b V1.52.841.1 Build/GRI40) AppleWebKit/533.1 (KHTML, like Gecko) Version/4.0 Mobile Safari/533.1

Once DDR process 10 has identified the bit between the language locale (e.g., "en-us; ",) and the" Build/" substring, DDR process 10 may still perform additional actions. For example, according to one or more embodiments, if the Model name contains "HTC":

Then, "HTC " (observe the extra space after "HTC"), "HTC_", "HTC-" or "HTC/", may be replaced by DDR process 10 with "HTC~", before any other action is taken.

As another example, if the Model name contains a slash ("/") character (in addition to the one which may have followed the "HTC" string and which may have been turned into a tilde (~) by DDR process 10 previously), DDR process 10 may remove the slash and anything after it.

As another example, if the model name contains a space (" ") and a combination of number and dot ("•") characters, DDR process 10 may remove everything, including the space.

As another example, if the model name contains a space and a capital V ("V") and a combination of number and dot ("•") characters, DDR process 10 may remove everything, including the space and the capital V.

With reference to the examples above, to get to a standard representation of the model name for the purpose of matching existing devices, the following are example transformations that DDR process 10 via the API may perform internally:

HTC Magic=>HTC~Magic
HTC_Magic=>HTC~Magic
HTC Wildfire=>HTC~Wildfire
HTC Wildfire 1.29.163.1=>HTC~Wildfire
HTC/DesireS/2.10.161.3=>HTC~DesireS
HTC_A510b V1.52.841.1=>HTC~A510b
HTC-A6366/1.0=>HTC~A6366

Other standard representations may also occur for other model names (e.g., "SAMSUNG", "ORANGE/", "LG-/" and ("/V" or "/v"), "[###########]", etc.) without departing from the scope of this disclosure.

After DDR process 10 extracts the device OS version and Model name from the UA string, DDR process 10 may normalize the string before DDR process 10 proceeds with RIS-based matching. Normalization may detect the device version (e.g., Android Version), detect the device model (or brand and model), remove language string, and reorganize the UA string internally in a way that may easily be matched by RIS. For example:

Mozilla/5.0 (Linux; U; Android 2.1-update1; en-ph; HTC Legend Build/ERE27) AppleWebKit/530.17 (KHTML, like Gecko) Version/4.0 Mobile Safari/530.17 may become:

2.1 HTC~Legend—Mozilla/5.0 (Linux; U; Android 2.1-update1; xx-xx; HTC Legend Build/ERE27) AppleWebKit/530.17 (KHTML, like Gecko) Version/4.0 Mobile Safari/530.17

Where in the non-limiting example: "2.1" stands for the Android version (retrieved through getAndroidOSVersion( )); "HTC~Legend" stands for the model name, as retrieved by the getAndroidModelVersion( ); "- - - " is the separator adopted by the API for internal use; and everything else is the original user-agent (with the exception of the language substring, which is normalized into "xx-xx" like usual).

Once DDR process 10 normalizes the UA string, DDR process 10 via the API may attempt matching through RIS. For example, according to one or more embodiments where it is assumed that the OS version and Model Name were identified, DDR process 10 may safely apply RIS on "- - -" to obtain a powerful match. The presence of a device profile with the right Model name and OS Version may be enough for DDR process 10 to obtain a match. The presence of the original UA may allow developers (via DDR process 10) to model firmware sub-versions, if this were needed. Where it is assumed that the OS version and Model Name were not identified, prior known strategies may be employed by DDR process 10.

In a non-limiting example where a UA is not recognized, yet it contains, e.g., "Android 3.1", "Android 3.2", "Android 3.3" or "Android 4.0", then DDR process 10 via a recovery heuristic may return generic_android_ver3_1, generic_android_ver3_2, generic_android_ver3_3 and generic_android_ver4_0 respectively.

DDR process 10 may implement a canHandle( ) process such that DDR process 10 may be determined whether, for example, a UA begins with "Mozilla/5" and contains one of the following: 'iPhone', 'iPod' or 'iPad'. The determination may be useful as an in-memory user-agent-string repurposing strategy to include correct matching of "Jail-Broken" iPhone devices and exclusion of false-positive iPhone UA strings.

DDR process 10 may calculate the tolerance as the character following the first underscore ("_"), and in case the underscore character is not contained in the UA string, DDR process 10 may use the following substring to calculate tolerance: "CPU like Mac OS X;" (wherein tolerance may be set at the index of the semicolon (";") after "X". DDR process 10 may then apply RIS with the tolerance calculated above.

In the above example, if the conclusive matching fails, DDR process 10 may (via a recovery matcher) identify and parse the OS string (e.g., "3_2_1", "4_0") and match the corresponding root device. If no underscore is found and the OS version cannot be detected, DDR process 10 may revert to e.g., "_ver1" for ipad, iphone and ipod respectively.

As noted above, DDR process 10 may support smartTV detection. For example, DDR process 10 may model the following example smartTV family (e.g., Device: generic_smarttv_browser) and subfamilies (e.g., Device: generic_smarttv_googletv_browser; Device: generic_smarttv_boxeebox_browser; Device: generic_smarttv_appletv_browser).

One or more Google TV UA strings may include, for example, "Mozilla/5.0 (X11; U; Linux i686; en-US) AppleWebKit/533.4 (KHTML, like Gecko) Chrome/5.0.375.127 Large Screen Safari/533.4 GoogleTV/b42732". DDR process 10 may, in one or more embodiments, assume that if a UA contains "GoogleTV", then DDR process 10 may return generic_smarttv_googletv_browser" ". Similarly, one or more Apple TV UA strings may include, for example, "iTunes-AppleTV/4.1". DDR process 10 may, in one or more embodiments, assume that if a UA contains "AppleTV", DDR process 10 may return generic_smarttv_appletv_browser" ". Similarly, one or more Boxee Box UA strings may include, for example, "Mozilla/5.0 (X11; U; Linux i686; en-US) AppleWebKit/533.4 (KHTML, like Gecko) Boxee/1.0.1 bxapi/7.1". DDR process 10 may, in one or more embodiments, assume that if a UA contains "Boxee", DDR process 10 may return generic_smarttv_boxee_browser.

In addition, as noted above, DDR process 10 may recognize a device as a smartTV if the User-Agent string contains one of the following non-limiting example substrings: 'dlna', 'sonydtv', 'smarttv'. In the example, DDR process 10 may return generic_smarttv_browser.

Figure 10:
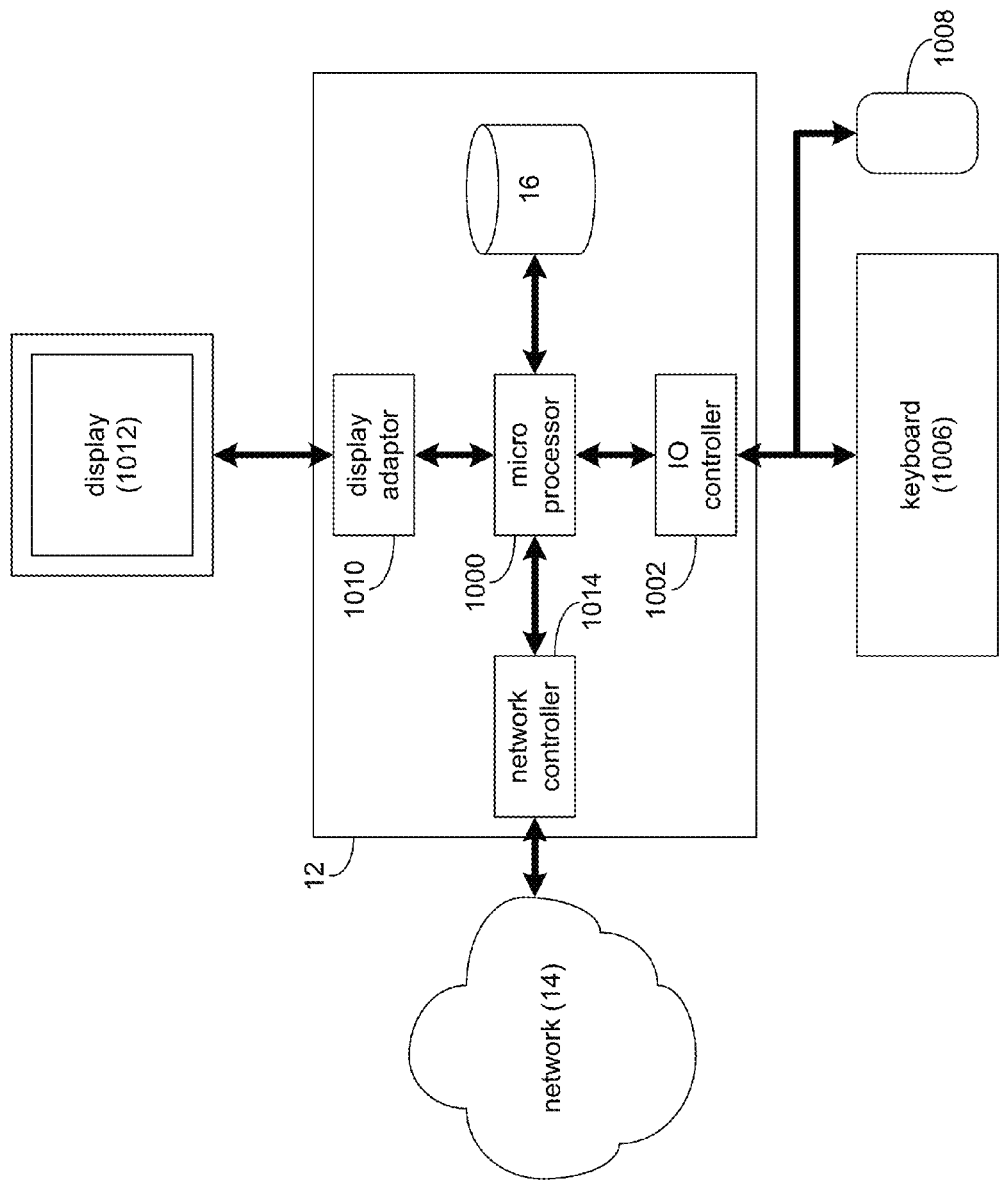
FIG. 10 is a diagrammatic view of the computing device of FIG. 1.

General:

Referring also to FIG. 10, there is shown a diagrammatic view of client computing system 12. While client computing system 12 is shown in this figure, this is for illustrative purposes only and is not intended to be a limitation of this disclosure, as other configuration are possible. For example, any computing device capable of executing, in whole or in part, DDR process 10 may be substituted for client computing device 12 within FIG. 10, examples of which may include but are not limited to client electronic devices 28, 30, 32, 34.

Computing system 12 may include microprocessor 1000 configured to e.g., process data and execute instructions/code for DDR process 10. Microprocessor 1000 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 1002 may be configured to couple microprocessor 1000 with various devices, such as keyboard 1006, mouse 1008, USB ports (not shown), and printer ports (not shown). Display adaptor 1010 may be configured to couple display 1012 (e.g., a CRT or LCD monitor) with microprocessor 1000, while network adapter 1014 (e.g., an Ethernet adapter) may be configured to couple microprocessor 1000 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus (e.g., client computing device 12), such that the instructions, which execute via the processor (e.g., processor 1000) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., client computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., client computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

identifying by a processor a plurality of string constants associated with an incoming data request, wherein identifying the plurality of string constants includes splitting up a user agent string in a header for the incoming data request into one or more individual words that are associated with a single category of devices, and counting a frequency of occurrence for the one or more individual words, and wherein identifying the plurality of string constants further includes at least one of patternizing the user agent string, and running a batch of one or more user agents through a set of one or more constants;

determining whether the one or more individual words include one or more constants in the user agent string that match one of the plurality of string constants, wherein the plurality of string constants and the frequency of occurrence for the one or more individual words identify the single category of the device including at least one of a mobile device type category, a desktop device type category, and a smartTV device type category;

based upon determining that the one or more constants in the user agent string match one of the plurality of string constants and the frequency of occurrence for the one or more individual words, identifying the single category of the device as at least one of the mobile device type category, the desktop device type category, and the smartTV device type category; and when the single category of the device is identified as the mobile device type category, creating a first generic web browser ID specific to the mobile device type category as a first device description repository ID for a device description repository, wherein the first generic web browser ID specific to the mobile device type category defines a first technical profile for the device in the device description repository as a mobile device type, wherein the first generic web browser ID is identified as the first device description repository ID without qualification of a mobile device type web browser version, when the single category of the device is identified as the desktop device type, creating a second generic web browser ID specific to the desktop device type category as a second device description repository ID for the device description repository, wherein the second generic web browser ID specific to the desktop device type category defines a second technical profile for the device in the device description repository as a desktop device type, wherein the second generic web browser ID is identified as the second device description repository ID without qualification of a desktop device type web browser version, when the single category of the device is identified as the smartTV device type, creating a third generic web browser ID specific to the smartTV category type of as a third device description repository ID for the device description repository, wherein the third generic web browser ID specific to the smartTV device type category defines a third technical profile for the device in the device description repository as a smartTV device type, wherein the third generic web browser ID is identified as the third device description repository ID without qualification of a smartTV web browser version.

2. The computer-implemented method of claim 1 wherein at least a portion of the plurality of string constants corresponds to a single web browser profile in the device description repository.

3. The computer-implemented method of claim 1 wherein running the batch of one or more user agents through the set of one or more constants includes:
counting a frequency of occurrences of each constant; and
determining an order of the one or more constants.

4. The computer-implemented method of claim 1 wherein the device description repository includes a wireless universal resource file.

5. A computer program product residing on a non-transitory computer readable storage medium having a plurality of instructions stored thereon which, when executed by a processor, cause the processor to perform operations comprising:
identifying a plurality of string constants associated with an incoming data request, wherein identifying the plurality of string constants includes splitting up a user agent string in a header for the incoming data request into one or more individual words that are associated with a single category of devices, and counting a frequency of occurrence for the one or more individual words, and wherein identifying the plurality of string constants further includes at least one of patternizinq the user agent string, and running a batch of one or more user agents through a set of one or more constants;

determining whether the one or more individual words include one or more constants in the user agent string that match one of the plurality of string constants, wherein the plurality of string constants and the frequency of occurrence for the one or more individual words identify the single category of the device including at least one of a mobile device type category, a desktop device type category, and a smartTV device type category;

based upon determining that the one or more constants in the user agent string match one of the plurality of string constants and the frequency of occurrence for the one or more individual words, identifying the single category of the device as at least one of the mobile device type category, the desktop device type category, and the smartTV device type category; and when the single category of the device is identified as the mobile device type category, creating a first generic web browser ID specific to the mobile device type category as a first device description repository ID for a device description repository, wherein the first generic web browser ID specific to the mobile device type category defines a first technical profile for the device in the device description repository as a mobile device type, wherein the first generic web browser ID is identified as the first device description repository ID without qualification of a mobile device type web browser version, when the single category of the device is identified as the desktop device type, creating a second generic web browser ID specific to the desktop device type category as a second device description repository ID for the device description repository, wherein the second generic web browser ID specific to the desktop device type category defines a second technical profile for the device in the device description repository as a desktop device type, wherein the second generic web browser ID is identified as the second device description repository ID without qualification of a desktop device type web browser version, when the single category of the device is identified as the smartTV device type, creating a third generic web browser ID specific to the smartTV category type of as a third device description repository ID for the device description repository, wherein the third generic web browser ID specific to the smartTV device type category defines a third technical profile for the device in the device description repository as a smartTV device type, wherein the third generic web browser ID is identified as the third device description repository ID without qualification of a smartTV web browser version.

6. The computer program product of claim 5 wherein at least a portion of the plurality of string constants corresponds to a single web browser profile in the device description repository.

7. The computer program product of claim 5 wherein running the batch of one or more user agents through the set of one or more constants includes:
counting a frequency of occurrences of each constant; and
determining an order of the one or more constants.

8. The computer program product of claim 5 wherein the device description repository includes a wireless universal resource file.

9. A computing system including a processor and memory configured to perform operations comprising:
- identifying by a processor a plurality of string constants associated with an incoming data request, wherein identifying the plurality of string constants includes splitting up a user agent string in a header for the incoming data request into one or more individual words that are associated with a single category of devices, and counting a frequency of occurrence for the one or more individual words, and wherein identifying the plurality of string constants further includes at least one of patternizinq the user agent string, and running a batch of one or more user agents through a set of one or more constants;
- determining whether the one or more individual words include one or more constants in the user agent string that match one of the plurality of string constants, wherein the plurality of string constants and the frequency of occurrence for the one or more individual words identify the single category of the device including at least one of a mobile device type category, a desktop device type category, and a smartTV device type category;
- based upon determining that the one or more constants in the user agent string match one of the plurality of string constants and the frequency of occurrence for the one or more individual words, identifying the single category of the device as at least one of the mobile device type category, the desktop device type category, and the smartTV device type category; and
  - when the single category of the device is identified as the mobile device type category, creating a first generic web browser ID specific to the mobile device type category as a first device description repository ID for a device description repository, wherein the first generic web browser ID specific to the mobile device type category defines a first technical profile for the device in the device description repository as a mobile device type, wherein the first generic web browser ID is identified as the first device description repository ID without qualification of a mobile device type web browser version,
  - when the single category of the device is identified as the desktop device type, creating a second generic web browser ID specific to the desktop device type category as a second device description repository ID for the device description repository, wherein the second generic web browser ID specific to the desktop device type category defines a second technical profile for the device in the device description repository as a desktop device type, wherein the second generic web browser ID is identified as the second device description repository ID without qualification of a desktop device type web browser version,
  - when the single category of the device is identified as the smartTV device type, creating a third generic web browser ID specific to the smartTV category type of as a third device description repository ID for the device description repository, wherein the third generic web browser ID specific to the smartTV device type category defines a third technical profile for the device in the device description repository as a smartTV device type, wherein the third generic web browser ID is identified as the third device description repository ID without qualification of a smartTV web browser version.

10. The computing system of claim 9 wherein at least a portion of the plurality of string constants corresponds to a single web browser profile in the device description repository.

11. The computing system of claim 9 wherein running the batch of one or more user agents through the set of one or more constants includes:
- counting a frequency of occurrences of each constant; and
- determining an order of the one or more constants.

12. The computing system of claim 9 wherein the device description repository includes a wireless universal resource file.